United States Patent [19]

Offe et al.

[11] Patent Number: 4,711,086

[45] Date of Patent: Dec. 8, 1987

[54] TRIDENT II FIRST AND SECOND STAGE INTERNAL INSULATION

[75] Inventors: Darrell L. Offe, Guernsey, Wyo.; R. Gregory Martin, South Jordan, Utah

[73] Assignee: The United States of America as represented by the Secretary of the Navy, Washington, D.C.

[21] Appl. No.: 921,571

[22] Filed: Oct. 24, 1986

[51] Int. Cl.$^4$ .......................... F02K 9/00; B29C 71/00
[52] U.S. Cl. ......................... 60/253; 60/255; 264/236; 264/314
[58] Field of Search ............ 60/253, 255, 270.1, 60/259; 264/314, 316, 347, 236; 102/287, 289, 290, 291

[56] References Cited

U.S. PATENT DOCUMENTS

| | | | |
|---|---|---|---|
| 3,080,269 | 3/1963 | Pollock et al. | 264/314 |
| 3,937,781 | 2/1976 | Allen | 264/314 |
| 3,946,557 | 3/1976 | Macbeth | 60/253 |
| 3,962,865 | 6/1976 | McCone, Jr. | 60/255 |
| 3,965,676 | 6/1976 | Schaffling | 60/255 |
| 4,031,154 | 12/1976 | O'Driscoll | 60/253 |
| 4,085,584 | 4/1978 | Jones et al. | 60/255 |
| 4,118,928 | 10/1978 | Lyles | 60/255 |
| 4,187,676 | 2/1980 | O'Neil et al. | 60/255 |
| 4,458,483 | 7/1984 | Vetter | 60/253 |

Primary Examiner—Louis J. Casaregola
Assistant Examiner—Timothy S. Thorpe
Attorney, Agent, or Firm—C. D. B. Curry; S. G. Precivale

[57] ABSTRACT

A rocket motor insulator of varied thickness with an integrated flap to reduce propellant stresses.

1 Claim, 4 Drawing Figures

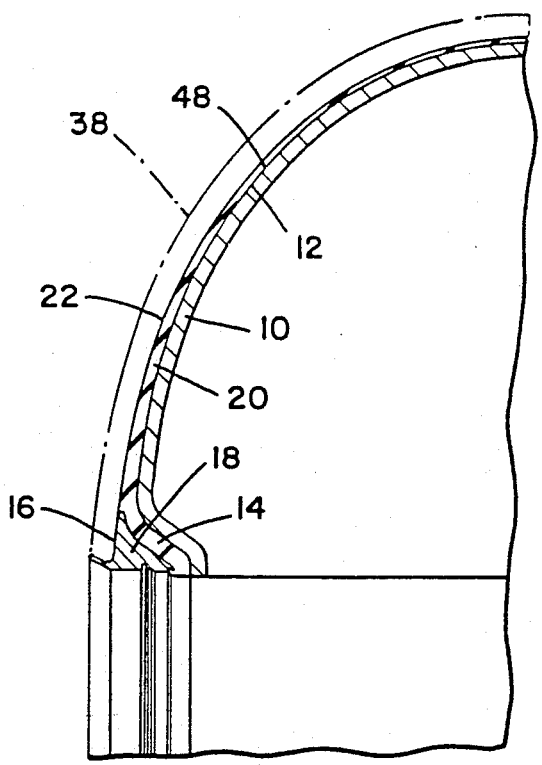
FIG _ 1
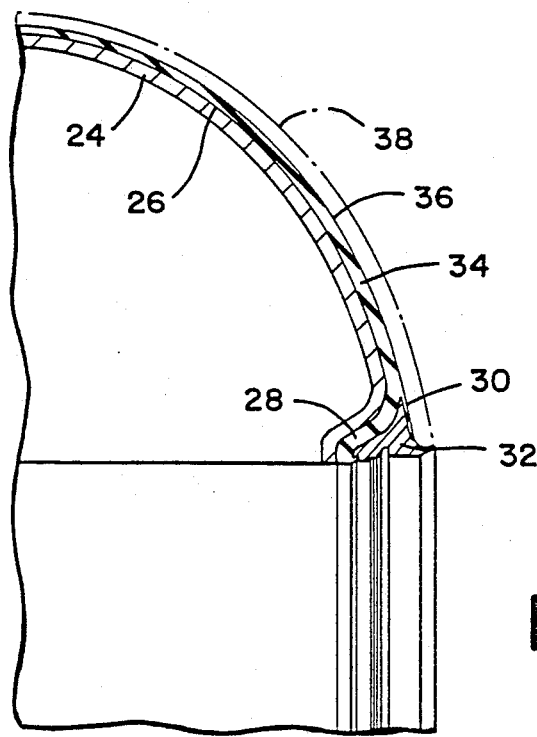
FIG _ 2

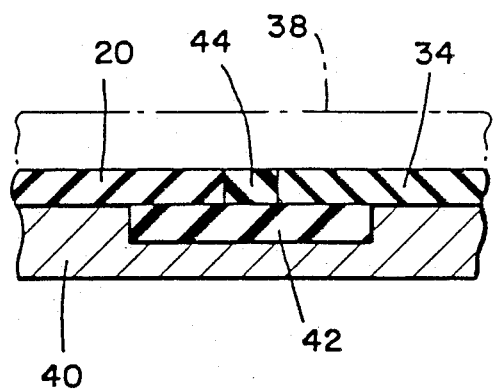
FIG _ 3
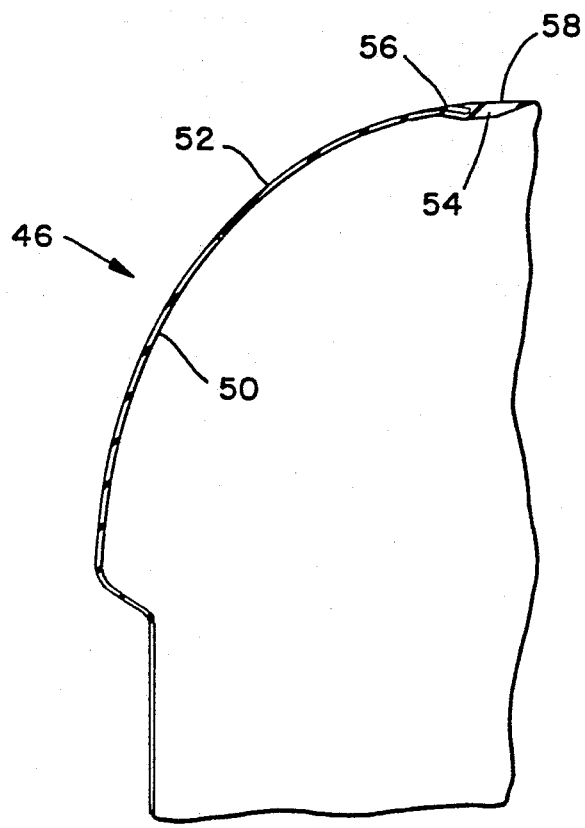
FIG _ 4

TRIDENT II FIRST AND SECOND STAGE INTERNAL INSULATION

SUMMARY OF THE INVENTION

This invention relates to rocket motor construction. More particularly, but without limitation thereto, this invention relates to an internal insulation system for rocket motors.

Despite the development of the art, there has remained a continuing need for improved manufacturing processes, better resistance to variable velocities of hot gas flow and insulative qualities in order to insure only moderate backside temperatures to protect the composite rocket motor chamber for the duration of motor operating time.

SUMMARY OF THE INVENTION

An object of the present invention is to develop an improved manufacturing process for rocket motor insulation.

A further object of the present invention is to develop an insulation with improved thermal resistance and insulative qualities.

These and other objects have been demonstrated by the present invention where an ethylene propylene diene monomer based compounded rubber material is manufactured into rocket motor insulation by a "lay up and grind" method.

BRIEF DESCRIPTION OF THE DRAWING

The invention will be described in further detail with reference to the accompanying drawings wherein:

FIG. 1 is a cross sectional view of the forward end rocket chamber insulator taken along the longitudinal axis;

FIG. 2 is a cross sectional view of the aft end rocket chamber insulator taken along the longitudinal axis;

FIG. 3 is an enlarged detail view of the junction between the forward end and aft end rocket chamber insulators; and FIG. 4 is a cross sectional view of the flap element.

DESCRIPTION OF THE PREFERRED EMBODIMENT

The manufacturing process for the insulative material used in the present invention shall be known as the "lay up and grind" method. This method utilizes calendared uncured compounded ethylene propylene diene monomer (EPDM) rubber stock tightly laid up on a fixed contoured metal mandrel with an integral dome end. This provides one end of a two or three piece insulator assembly. For ease of manufacture, each mandrel is coated with a non-stick surface such as TEFLON.

A bleeder cloth and vacuum bag are placed over the uncured rubber and a vacuum is introduced in the bag in order to remove volatiles during the cure process which is done in an autoclave. In the past, portions of the rubber were cured at different times. This invention cures all the rubber at the same time, which provides better uniformity in the insulation.

This invention is best illustrated in FIG. 1. The mandrel 10 has a fixed contour corresponding to the forward end of a rocket motor. The uncured rubber stock is laid up on the non-stick surface 12 of the mandrel, and the forward bearing ring 18 is integrated with the rubber through the use of mandrel tooling. During rubber cure in an autoclave, forward insulator elements 14 and 16 vulcanize and form a bond to the forward bearing ring 18 and are concurrently joined by vulcanization to the forward insulator 20, thus forming the cured forward insulator assembly. A bleeder cloth and vacuum bag are placed over the uncured rubber surface (outside contour) 22 of the insulator 20, to prepare for the curing process. The same principle applies to the aft end of the rocket motor as shown in FIG. 2. The mandrel 24 is contoured to meet the aft end requirements. To form the aft insulator assembly, rubber is laid upon the mandrel surface 26. During rubber cure, aft insulator elements 28 and 30 form a bond to the aft bearing ring 32 and are concurrently vulcanized to the aft insulator 34. Prior to cure, a bleeder cloth and vacuum bag are placed over the rubber surface(outside contour) 36 as is done with the forward end in FIG. 1.

After cool-down, the outside contour 22 of the forward insulator 20 and likewise the outside contour 36 of the aft insulator 34, are machined to grind out the high spots and buffed to the final dimensions, which conform to the contour of the inner surface of the rocket chamber 38.

This machining process provides for an insulator of varied thickness. It is important to note that the insulator's outside contour and likewise the chamber's inside contour, is determined by the thermal requirements, i.e. the grain design.

Subsequent to inspection and testing, the forward 20 and aft 34 insulators are removed from their respective mandrels 10 and 24, and placed on a collapsible chamber mandrel 40 as is shown in FIG. 3. This operation requires placing the two insulator halves 20 and 34 adjacent to each other to form a cylinder with forward and aft contour domes. A strip of uncured rubber 42 is placed at the junction of the insulator halves 20 and 34. Uncured rubber filler 44 is then placed in the gap between insulator halves 20 and 34 and cured concurrently with strip 42 under heat and pressure thereby forming a vulcanized bond with insulator halves 20 and 34. Splicing of the forward 20 and aft 34 dome insulators in this manner provides for a bond without weak spots. Vulcanization has distinct advantages over traditional adhesive bonds where it is often difficult to avoid the presence of voids. Any unevenness of the insulator's internal surface at the junction due to the rubber strip 42 is remedied by the powder embedment technique of casting the propellant.

At this point in the process, filament winding of the rocket motor chamber begins, adjacent to the forward 22 and aft 36 outside surfaces. After the filament wound composite chamber is cured, the collapsible internal mandrel 40 is disassembled and removed through a small centerport leaving a variable thickness insulative liner in the composite rocket motor chamber.

This variable thickness insulator provides the optimal amount of protection necessary in both moderate and extreme thermal environments thereby yielding the lightest weight possible for the insulation.

The internal insulator assembly also includes an integrated stress relief flap 46. This flap is also fabricated by the lay up and grind method, and is bonded to the forward insulator inside surface 48 subsequent to the winding of the chamber 38. The propellant is then cast directly against the flap surface 50.

Propellant stresses during cure, storage and actual performance are greatly reduced by the presence of the flap. The free-moving flap element 52 is attached to a bulb 54 which contains a stress relief groove 56 formed by a silicone extrusion. The bulb 54 is fabricated from four separate rubber extrusions that allow for the convenient placement of the silicone extrusion. The configuration and presence of the silicone extrusion will result in more uniform stress distribution and better (void free) flap bonds as well. The bulb's outer surface 58 is bonded to the forward insulator inside surface 48 while the flap 52 lies adjacent to surface 48 but remains free-moving.

This invention has been described in detail with particular reference to certain preferred embodiments thereof, but it will be understood that variations and modifications can be effected within the spirit and scope of the invention.

What is claimed is:

1. A rocket motor insulator assembly comprised of a forward and an aft insulator assembly joined by a vulcanized bond to form a cylinder having forward and aft contoured domes and a stress relief flap wherein:

said forward insulator assembly comprises a forward insulator of varied thickness having an outside contour and an inside surface, said forward insulator being formed by laying rubber stock on a first mandrel followed by curing and grinding said outside contour to the desired configuration, a forward bearing ring and a first and a second forward insulator element bonded to said forward bearing ring and concurrently joined by vulcanization to said forward insulator;

said aft insulator assembly comprises an aft insulator of varied thickness having an outside contour, said aft insulator being formed by laying rubber stock on a second mandrel, followed by curing and grinding said outside contour to the desired configuration, an aft bearing ring and a first and a second aft insulator element bonded to said aft bearing ring and concurrently joined by vulcanization to said aft insulator;

said vulcanized bond is formed by removing said forward and said aft insulator assemblies from said first and said second mandrels, placing said assemblies on a collapsible mandrel in such a manner so that said forward and said aft insulators are adjacent and form a junction having a gap and placing a filler of uncured rubber in said gap and a strip of uncured rubber at said junction to splice said forward and said aft insulators; and said stress relief flap comprises a free-moving flap element and a rubber bulb having a stress relief groove formed by a silicone extrusion, said bulb lying adjacent to and bonded to said inside surface of said forward insulator.

* * * * *